(No Model.)
E. R. HYDE.
BEARING FOR EMERY WHEEL SHAFTS.
No. 560,214. Patented May 19, 1896.
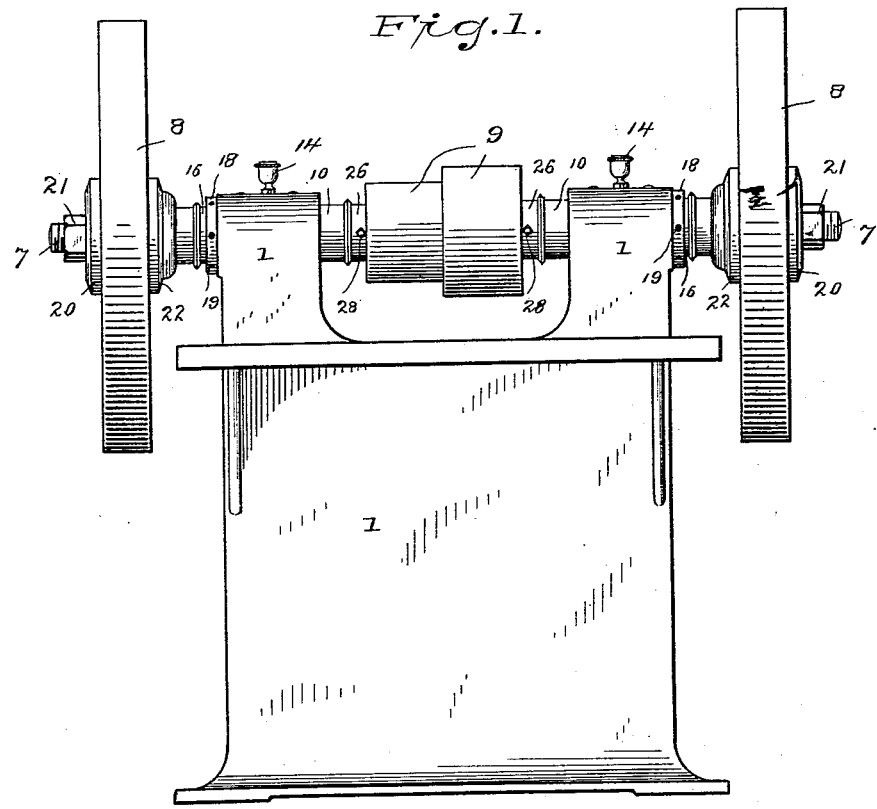
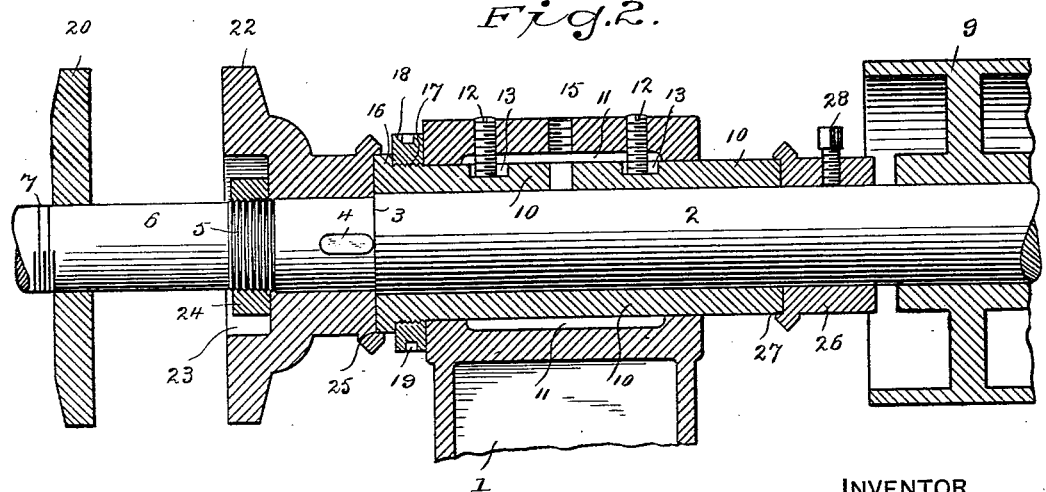
WITNESSES
INVENTOR

UNITED STATES PATENT OFFICE.

ELWIN R. HYDE, OF BRIDGEPORT, CONNECTICUT.

BEARING FOR EMERY-WHEEL SHAFTS.

SPECIFICATION forming part of Letters Patent No. 560,214, dated May 19, 1896.

Application filed July 23, 1894. Serial No. 518,305. (No model.)

*To all whom it may concern:*

Be it known that I, ELWIN R. HYDE, a citizen of the United States, residing at Bridgeport, in the county of Fairfield and State of Connecticut, have invented certain new and useful Improvements in Bearings for Emery-Wheel Shafts; and I do hereby declare the following to be a full, clear, and exact description of the invention, such as will enable others skilled in the art to which it appertains to make and use the same.

My invention relates to shaft-bearings adapted for general use, but more especially adapted as a bearing for the shafts of emery-wheels in grinding-machines, the special object being to provide a bearing which shall be protected as fully as possible against the entrance of emery-dust, which may be readily adjusted without removal of parts to take up lost motion caused by endwise thrust of the shaft, and which, furthermore, when worn out may be readily removed by simply removing the grinding-wheel, but without removing the shaft from the machine. With these ends in view I have devised the novel construction of which the following description, in connection with the accompanying drawings, is a specification, numbers being used to designate the several parts.

Figure 1 is an end elevation of a grinding-machine, illustrating the application thereto of my novel invention; and Fig. 2 is a longitudinal section, on an enlarged scale, of the bearing, collars, and parts operating in connection therewith, the shaft being in elevation.

1 denotes the frame of the machine, and 2 the shaft, which is provided with a shoulder 3, a rib or key 4, a threaded portion 5, and a reduced portion 6, which is threaded at the outer end, as at 7.

8 denotes emery-wheels, and 9 belt-pulleys, by which the shaft is driven.

10 denotes my novel bearing-sleeves, which are passed into openings 11 in the frame, adapted to receive them. Each bearing is held against rotary movement by set-screws 12 in the frame, which engage slots 13 in the bearing-sleeve, the slots being provided so as to permit longitudinal movement of the sleeve in adjusting.

14 denotes oil-cups, which engage openings 15 in the frame.

Each bearing-sleeve is provided at its outer end with a head 16 and just within the head with a threaded portion 17, which is engaged by an adjusting-nut 18, said nut bearing against the head, as clearly shown, and being provided with holes 19 to receive a pin for the purpose of rotating the nut in adjusting.

20 denotes the outer collar, which is held in position at the outer end of the shaft by a nut 21, engaging threaded portion 7, and 22 denotes the inner collar, which is provided in its inner face with a recess 23, which receives a nut 24, engaging threaded portion 5, by which the collar is rigidly locked in position against the head 16 of the bearing-sleeve, said inner collar being held rigidly against rotation on the shaft by rib or key 4, which engages a corresponding groove (not shown) in the collar. The inner end of collar 22 is provided with a recess 25, which receives the head 16 of the bearing-sleeve and acts to prevent the entrance of emery-dust between the ends of the bearing-sleeve and the collar. At the other end of the bearing-sleeve I may or may not place a sleeve 26, which is provided with a recess 27 to receive the end of the sleeve and is locked in position on the shaft by a set-screw 28.

In setting up the machine the bearing-sleeve is placed over the shaft and is passed into opening 11 in the casting, it being understood, of course, that in this class of machines an emery-wheel is ordinarily placed at each end of the shaft. Collar 22 is then set up against the head of the bearing-sleeve and is locked there by nut 24. The emery-wheel is then placed upon the shaft, after which collar 20 is placed in position and is locked there by nut 21. The wear in use, of course, comes between the head 16 of the bearing-sleeve and the inner end of collar 22. As soon as the slightest endwise movement of the shaft takes place or any irregularity in the movement of the emery-wheel, it may be taken up by rotation of adjusting-nut 18, the action of which, when turned in the right direction, will be to move the bearing-sleeve toward the left, as shown in Fig. 2, setting it up tightly against the inner end of collar 22, slots 13 in the bearing-sleeve permitting free endwise movement thereof, but holding it securely against rotary movement.

Should the bearing-sleeve become worn to such an extent as to require replacing, this may readily be done without taking the machine apart. The operator removes collars 20 and 22 and the emery-wheel and turns out set-screws 12, after which the bearing may be readily removed and a new one inserted, it being unnecessary to remove the shaft or to remove any of the other parts of the machine.

Having thus described my invention, I claim—

1. In a machine of the character described the combination with a shaft having a shoulder 3 and a threaded portion 5, of a bearing-sleeve for said shaft having a head 16 and a threaded portion 17, an inner collar having a recess 23, a nut in said recess engaging the threaded portion 5 of the shaft, and a nut 18 on the bearing-sleeve which bears against the head and acts when turned to move the bearing-sleeve longitudinally.

2. The combination with a shaft and a bearing-sleeve having a threaded portion 17 and head 16, of nut 18 engaging the threaded portion and bearing against the head to move the bearing-sleeve longitudinally on the shaft, and suitable means for retaining the bearing-sleeve against rotation.

3. The combination with a shaft and a bearing-sleeve having slots 13, threaded portion 17 and head 16, of nut 18 engaging the threaded portion and bearing against the head to move the bearing-sleeve longitudinally on the shaft, and set-screws engaging the slots whereby the bearing-sleeve is held against rotation.

4. The combination with a shaft having a shoulder 3 and a threaded portion 5, of a bearing-sleeve for said shaft having a head 16 and a threaded portion 17, an inner collar having in its outer face a recess 25 to receive the head and in its inner face a recess 23, a nut in said recess engaging the threaded portion of the shaft to retain said collar against the shoulder, and a nut 18 on the bearing-sleeve whereby the sleeve may be moved longitudinally and retained in close engagement with the inner sleeve.

In testimony whereof I affix my signature in presence of two witnesses.

ELWIN R. HYDE.

Witnesses:
A. M. WOOSTER,
S. V. RICHARDSON.